United States Patent
Kim et al.

(10) Patent No.: US 12,091,549 B2
(45) Date of Patent: Sep. 17, 2024

(54) METHOD FOR PREPARING CARBOXYLIC ACID MODIFIED-NITRILE BASED COPOLYMER LATEX

(71) Applicant: LG CHEM, LTD., Seoul (KR)

(72) Inventors: Jung Eun Kim, Daejeon (KR); Ji Hyun Kim, Daejeon (KR); Sang Jin Shin, Daejeon (KR); Seung Uk Yeu, Daejeon (KR); Seung Whan Oh, Daejeon (KR)

(73) Assignee: LG CHEM, LTD., Seoul (KR)

( * ) Notice: Subject to any disclaimer, the term of this patent is extended or adjusted under 35 U.S.C. 154(b) by 502 days.

(21) Appl. No.: 17/606,126

(22) PCT Filed: Mar. 22, 2021

(86) PCT No.: PCT/KR2021/003486
§ 371 (c)(1),
(2) Date: Oct. 25, 2021

(87) PCT Pub. No.: WO2021/241866
PCT Pub. Date: Dec. 2, 2021

(65) Prior Publication Data
US 2022/0306843 A1    Sep. 29, 2022

(30) Foreign Application Priority Data

May 26, 2020  (KR) .................. 10-2020-0062901
Mar. 15, 2021  (KR) .................. 10-2021-0033177

(51) Int. Cl.
| | | |
|---|---|---|
| C08L 9/04 | (2006.01) | |
| C08F 2/22 | (2006.01) | |
| C08F 220/06 | (2006.01) | |
| C08F 220/20 | (2006.01) | |
| C08F 236/12 | (2006.01) | |

(52) U.S. Cl.
CPC .................. *C08L 9/04* (2013.01); *C08F 2/22* (2013.01); *C08F 220/06* (2013.01); *C08F 220/20* (2013.01)

(58) Field of Classification Search
None
See application file for complete search history.

(56) References Cited

U.S. PATENT DOCUMENTS

| | | |
|---|---|---|
| 6,221,952 B1 | 4/2001 | Nakamae |
| 2017/0058100 A1 | 3/2017 | Nakashima et al. |
| 2020/0317893 A1 | 10/2020 | Kim et al. |

FOREIGN PATENT DOCUMENTS

| | | |
|---|---|---|
| CN | 1201803 A | 12/1998 |
| CN | 101649026 A | 2/2010 |
| CN | 102653579 A | 9/2012 |
| CN | 103450397 A | 12/2013 |
| CN | 110114133 A | 8/2019 |
| CN | 111094371 A | 5/2020 |
| JP | 2002-037808 A | 2/2002 |
| JP | 2004204148 A | * 7/2004 |
| JP | 2004-323771 A | 11/2004 |
| JP | 2006-321954 A | 11/2006 |
| JP | 2007-177091 A | 7/2007 |
| KR | 10-0159140 B1 | 1/1999 |
| KR | 10-0360947 B1 | 1/2003 |
| KR | 10-2015-0057092 A | 5/2015 |
| KR | 10-2016-0061125 A | 5/2016 |
| KR | 10-2016-0127008 A | 11/2016 |
| KR | 10-1785768 B1 | 10/2017 |
| KR | 10-1920009 B1 | 11/2018 |
| KR | 10-2112590 B1 | 5/2020 |

OTHER PUBLICATIONS

Machine translation of JP-2004204148-A (no date).*
International Search Report and Written Opinion issued in corresponding International Patent Application No. PCT/KR2021/003486, dated Mar. 22, 2021.
Chinese Office Action dated Sep. 26, 2023, issued in corresponding Chinese Patent Application No. 202180003046.7.

* cited by examiner

*Primary Examiner* — Michael J Feely
(74) *Attorney, Agent, or Firm* — Morgan, Lewis & Bockius LLP

(57) ABSTRACT

Disclosed is a method of preparing a carboxylic acid modified-nitrile based copolymer latex including: initiating emulsion polymerization of a monomer mixture including a conjugated diene-based monomer, ethylenic unsaturated nitrile-based monomer, ethylenic unsaturated acid monomer, and water-soluble monomer in the presence of water and 0.01 to 0.1 parts by weight of a lipid-soluble initiator based on 100 parts by weight of total of monomer mixture, and at a weight ratio (M/W) of the monomer mixture to water of 1.1 to 1.4 (S10); adding water when the polymerization conversion rate is 30 to 40% at a weight ratio (M/W) of 0.8 to 1.0 (S20); and adding water when the polymerization conversion rate is 60 to 70% at a weight ratio (M/W) of 0.6 to 0.7 (S30), when the polymerization conversion rate is between ≥10% and <60%, 0.1 to 2.0 parts by weight of sodium naphthalene sulfonate formaldehyde condensate based on 100 parts by weight of the total monomer mixture is introduced.

12 Claims, No Drawings

METHOD FOR PREPARING CARBOXYLIC ACID MODIFIED-NITRILE BASED COPOLYMER LATEX

TECHNICAL FIELD

CROSS-REFERENCE TO RELATED APPLICATIONS

The present application claims the benefit of priorities to Korean Patent Application Nos. 10-2020-0062901, filed on May 26, 2020, and 10-2021-0033177, filed on Mar. 15, 2021, the entire contents of which are incorporated herein as a part of the specification.

TECHNICAL FIELD

The present invention relates to a method of preparing a carboxylic acid modified-nitrile based copolymer latex, and more particularly, to a technology of using an ethylenic unsaturated acid monomer and a water-soluble monomer, improving polymerization stability of a copolymer latex even under a polymerization reaction condition of a Reynolds number of 10,000 or more to provide a latex composition for dip molding having excellent workability, and applying the latex composition to a dip-molded article which is manufactured therefrom and has excellent tensile properties.

BACKGROUND ART

Disposable rubber gloves which are used in housework, the food industry, the electronic industry, and the medical field in various ways in everyday life are manufactured by dip molding of natural rubber or a carboxylic acid modified-nitrile based copolymer latex. In recent years, carboxylic acid modified-nitrile based gloves have been spotlighted in the disposable glove market, due to an allergy problem caused by a natural protein of natural rubber and an unstable supply and demand problem.

Meanwhile, to keep up with the increasing demand, various attempts have been made to increase glove productivity. The most commonly used one among the attempts is to maintain strength while making the gloves thin. In the past, disposable nitrile-based gloves weighing about 4 g were generally used, while currently, gloves which are made thin to about 3 g and express a tensile strength of 6 N or more are demanded. In order to manufacture thin gloves as such, a glove molded article is manufactured with a flocculant having a low concentration and a latex composition, and in this case, workability such as syneresis is deteriorated.

Another attempt to increase glove productivity is to increase a line speed, and in this case also, high workability is required.

A latex having both high strength and excellent workability as such is demanded, but the strength and the workability of the glove are actually in a trade-off relationship. A film formation speed of a latex determines the strength and the workability of gloves, and when the film formation speed is fast, gloves having high strength but bad workability are manufactured, and when the film formation speed is slow, gloves having excellent workability but low strength are manufactured. Thus, development of a carboxylic acid modified-nitrile based copolymer latex which may secure high tensile strength even in the case of being made thin in a production line at a fast speed and has excellent workability is demanded.

In the conventional technologies, it was intended to solve the problem by adding some water-soluble monomers to prepare a carboxylic acid modified-nitrile based copolymer latex; however, when the water-soluble monomer and an unsaturated carboxylic acid monomer are used together under turbulent conditions of a large polymerization reactor and a Reynolds number of 10,000 or more, a large amount of water-soluble oligomers are formed to deteriorate polymerization stability and a large amount of coagulum caused by a water-soluble oligomer are produced in the prepared latex, and thus, the latex was inappropriate for use in manufacture of a dip-molded article. That is, it is currently impossible to practically apply a carboxylic acid modified-nitrile based copolymer latex prepared in an industrial site under conditions of a Reynolds number in a reactor of 10,000 or more to a dip-molded article.

DISCLOSURE

Technical Problem

In order to solve the problems mentioned in the Background Art, an object of the present invention is to use an ethylenic unsaturated acid monomer and a water-soluble monomer and improve polymerization stability of a copolymer latex even under a polymerization reaction condition of a Reynolds number of 10,000 or more to prepare a latex composition for dip molding having excellent workability, and to apply the composition to a dip-molded article which is manufactured therefrom and has excellent tensile properties.

Technical Solution

In one general aspect, a method of preparing a carboxylic acid modified-nitrile based copolymer latex includes: initiating emulsion polymerization of a monomer mixture including a conjugated diene-based monomer, an ethylenic unsaturated nitrile-based monomer, an ethylenic unsaturated acid monomer, and a water-soluble monomer in the presence of 0.01 to 0.1 parts by weight of a lipid-soluble initiator with respect to a total of 100 parts by weight of the monomer mixture and water, under a condition of a weight ratio (M/W) of the monomer mixture to water of 1.1 to 1.4, in a reactor (S10); adding water when a polymerization conversion rate of the polymerization is 30 to 40% to control the weight ratio (M/W) to 0.8 to 1.0 (S20); and adding water when the polymerization conversion rate of the polymerization is 60 to 70% to control the weight ratio (M/W) to 0.6 to 0.7 (S30), wherein when the polymerization conversion rate of the polymerization is 10% or more and less than 60%, 0.1 to 2.0 parts by weight of a sodium naphthalene sulfonate formaldehyde condensate with respect to a total of 100 parts by weight of the monomer mixture is introduced.

Advantageous Effects

The method of preparing a carboxylic acid modified-nitrile based copolymer latex according to the present invention may use an ethylenic unsaturated acid monomer and a water-soluble monomer and improve polymerization stability of a copolymer latex even under a polymerization reaction condition of a Reynolds number of 10,000 or more to produce a latex composition for dip molding having excellent workability, and may provide a dip-molded article having excellent tensile properties.

Best Mode

The terms and words used in the description and claims of the present invention are not to be construed limitedly as having general or dictionary meanings but are to be construed as having meanings and concepts meeting the technical ideas of the present invention, based on a principle that the inventors are able to appropriately define the concepts of terms in order to describe their own inventions in the best mode.

The term "copolymer" in the present invention may refer to all copolymers formed by copolymerization of comonomers, and as a specific example, may refer to both a random copolymer and a block copolymer.

The term "latex" in the present invention may refer to a polymer or copolymer polymerized by polymerization existing in the form of being dispersed in water, and as a specific example, may refer to a rubbery polymer or rubbery copolymer particulates polymerized by emulsion polymerization existing in the form of being dispersed in water in a colloid state.

The term "derived layer" in the present invention may refer to a layer formed from a polymer or a copolymer, and as a specific example, a layer formed from a polymer or a copolymer by attaching, fixing, and/or polymerizing a polymer or copolymer on a dip mold during manufacture of a molded article by dip molding.

The term "alkyl" in the present invention may refer to a linear or branched saturated monovalent hydrocarbon of carbon atoms, such as, methyl, ethyl, propyl, 2-propyl, n-butyl, iso-butyl, tert-butyl, pentyl, hexyl, and dodecyl, or may include alkyl substituted by a substituent as well as unsubstituted alkyl.

The term "(meth)acrylate" in the present invention may refer to both acrylate and methacrylate.

The term "Reynolds number (Re)" in the present invention is a dimensionless number used for predicting a fluid flow in a tube, and may be represented by inertial forces and viscous forces, according to the following Equation 1:

$$Re = Vs(d/v) \quad \text{[Equation 1]}$$

wherein Vs is an average flow velocity (m/s) in a tube, d is an inner diameter (m) of a tube, v is a kinematic viscosity coefficient (m$^2$/s) of a fluid, and Re of 2,320 or less means a laminar flow and Re of more than 2,320 means a turbulent flow.

Hereinafter, the present invention will be described in more detail for better understanding of the present invention.

According to the present invention, a method of preparing a carboxylic acid modified-nitrile based copolymer latex is provided. The method includes: initiating emulsion polymerization of a monomer mixture including a conjugated diene-based monomer, an ethylenic unsaturated nitrile-based monomer, an ethylenic unsaturated acid monomer, and a water-soluble monomer in the presence of 0.01 to 0.1 parts by weight of a lipid-soluble initiator with respect to a total of 100 parts by weight of the monomer mixture and water, under a condition of a weight ratio (M/W) of the monomer mixture to water of 1.1 to 1.4, in a reactor (S10); adding water when a polymerization conversion rate of the polymerization is 30 to 40% to control the weight ratio (M/W) to 0.8 to 1.0 (S20); and adding water when the polymerization conversion rate of the polymerization is 60 to 70% to control the weight ratio (M/W) to 0.6 to 0.7 (S30), wherein when the polymerization conversion rate of the polymerization is 10% or more and less than 60%, 0.1 to 2.0 parts by weight of a sodium naphthalene sulfonate formaldehyde condensate with respect to a total of 100 parts by weight of the monomer mixture is introduced.

In general, since a batch reactor used in the industrial site has an increased volume and an increased impeller size for improving productivity, a reaction system in the reactor is not in a steady state and becomes an unsteady state. As a result, a Reynolds number (Re) for a fluid flow in the reactor is a very high value of 10,000 or more to hundreds of thousands, so that a turbulent flow is formed.

Meanwhile, in emulsion polymerization, when an emulsifier having a concentration equivalent to or higher than a critical micelle concentration (CMC) is introduced, polymerization of monomers proceeds in a micelle formed by the emulsifier, and as before, when a water-soluble monomer in a copolymer is included for improving the strength and workability of a molded article manufactured using a carboxylic acid modified-nitrile based copolymer latex, a ratio of a monomer having a high solubility in water is increased, so that polymerization is performed in a certain part, in a water phase as well as inside a micelle.

As described above, when a diffusion velocity of monomers is increased by formation of a turbulent flow in a reactor having a Reynolds number of 10,000 or more, formation of a water-soluble oligomer is promoted by rapid polymerization of an ethylenic unsaturated acid monomer and water-soluble monomers in a micelle. In addition, a polymerization reaction rate of monomers dissolved in an aqueous phase is increased. As such, when water-soluble monomers have a size not to be dissolved in water any more by a rapid polymerization reaction of the water-soluble monomers, they agglomerate together to form a large amount of water-soluble oligomers or are adsorbed on polymer particles formed to proceed with polymerization. In particular, when crosslinking of the conjugated diene-based monomer is not performed at the beginning of polymerization so that fluidity of a polymer chain is high, in order to maintain a thermodynamically stable state, the water-soluble oligomers tend to exist more on the surface of polymer particles. As a result, hydrophilicity of the polymer particles is increased so that adsorptivity to a hydrophobic part of an emulsifier is decreased and the polymer particles having a hydrophilic surface agglomerate together. However, in this case, a large amount of coagulum is included in a finally produced copolymer latex, which is rather inappropriate for use in manufacture of a dip-molded article.

As described above, in a reactor having a Reynolds number of 10,000 or more, in order to solve the problem arising when a water-soluble monomer is used together in polymerization of a copolymer including an ethylenic unsaturated acid monomer, in the present invention, as described above, a lipid-soluble initiator is used at the initiation of polymerization, a sodium naphthalene sulfonate formaldehyde condensate (hereinafter, referred to as a condensate) is introduced when a polymerization conversion rate is 10% or more and less than 60%, and water is introduced before polymerization initiation and when a polymerization conversion rate is 30 to 40% and 60 to 70%, thereby lowering a coagulum content in a copolymer latex to improve polymerization stability, and improving both the workability of a composition for dip molding including the copolymer latex and the strength of a dip-molded article.

Meanwhile, for example, in the case in which the lipid-soluble initiator is not introduced at the initiation of polymerization, the condensate is not introduced when the polymerization conversion rate is 10% or more and less than 60%, the condensate is introduced when the polymerization conversion rate is 60% or more, or the value of the weight ratio (M/W) (weight ratio of the monomer mixture to the total weight of water) is out of an appropriate range before initiation of polymerization and when the polymerization conversion rate is 30 to 40% and 60 to 70%, polymerization stability of the copolymer latex may be lowered, workability of the composition for dip molding including the copolymer latex may be deteriorated, or tensile strength of the dip-molded article may be lowered.

According to an exemplary embodiment of the present invention, in S10, emulsion polymerization of a monomer mixture including a conjugated diene-based monomer, an ethylenic unsaturated nitrile-based monomer, an ethylenic unsaturated acid monomer, and a water-soluble monomer is initiated in the presence of 0.01 to 0.1 parts by weight of a lipid-soluble initiator with respect to a total of 100 parts by weight of the monomer mixture and water, in which a weight ratio (M/W) of the monomer mixture to water is controlled to 1.1 to 1.4, and by adjusting the contents of the monomers in the monomer mixture, the physical properties of the carboxylic acid modified-nitrile based copolymer may be adjusted.

The conjugated diene-based monomer may include one or more selected from the group consisting of 1,3-butadiene, 1,4-butadiene, 2,3-dimethyl-1,3-butadiene, 2-ethyl-1,3-butadiene, 1,3-pentadiene, piperylene, 3-butyl-1,3-octadiene, 2-phenyl-1,3-butadiene, and isoprene, and as a specific example, the conjugated diene-based monomer may be 1,3-butadiene.

The content of the conjugated diene-based monomer may be 40 to 70 wt %, 50 to 68 wt %, or 60 to 65 wt % with respect to the total content of the monomer mixture, and within the range, oil resistance and tensile strength of a molded article manufactured from the carboxylic acid modified-nitrile based copolymer are excellent, and flexibility and wearing comfort are improved.

The ethylenic unsaturated nitrile-based monomer may include one or more selected from the group consisting of acrylonitrile, methacrylonitrile, α-chloronitrile, and α-cyanoethyl acrylonitrile, and as a specific example, the ethylenic unsaturated nitrile-based monomer may be acrylonitrile.

The content of the ethylenic unsaturated nitrile-based monomer may be 20 to 40 wt %, 25 to 35 wt %, or 28 to 30 wt % with respect to the total content of the monomer mixture, and within the range, the oil resistance and the tensile strength of a molded article manufactured from the carboxylic acid modified-nitrile based copolymer are excellent, and flexibility and wearing comfort are improved.

The ethylenic unsaturated acid monomer may be an ethylenic unsaturated monomer containing an acid group such as a carboxyl group, a sulfonic acid group, and an acid anhydride group; and a specific example thereof may be one or more selected from the group consisting of ethylenic unsaturated acid monomers such as acrylic acid, methacrylic acid, itaconic acid, maleic acid, and fumaric acid; polyanhydrides such as anhydrous maleic acid and anhydrous citraconic acid; ethylenic unsaturated sulfonic acid monomers such as styrene sulfonic acid; and ethylenic unsaturated polycarboxylic acid partial ester monomers such as monobutyl fumarate, monobutyl maleate, and mono-2-hydroxypropyl maleate, a more specific example thereof may be one or more selected from the group consisting of acrylic acid, methacrylic acid, itaconic acid, maleic acid, and fumaric acid, and a still more specific example may be methacrylic acid. The ethylenic unsaturated acid monomer may be used in the form of a salt such as an alkali metal salt or an ammonium salt in polymerization.

The content of the ethylenic unsaturated acid monomer may be 4 to 10 wt %, 5 to 9 wt %, or 6 to 8 wt % with respect to the total content of the monomer mixture, and within the range, the tensile strength of a molded article manufactured from the carboxylic acid modified-nitrile based copolymer is excellent, and flexibility and wearing comfort are improved.

The water-soluble monomer may include one or more selected from the group consisting of hydroxyalkyl (meth)acrylate including 2-hydroxyethyl methacrylate, 2-hydroxypropyl methacrylate, 3-hydroxypropyl methacrylate, 2-hydroxyethyl acrylate, 2-hydroxypropyl acrylate, and 3-hydroxypropyl acrylate; and acrylamide, and as a specific example, the water-soluble monomer may be 2-hydroxyethyl methacrylate.

The content of the water-soluble monomer may be 0.5 to 10 wt %, 1.0 to 5 wt %, or 1.5 to 2.0 wt % with respect to the total content of the monomer mixture, and within the range, the polymerization stability of the copolymer latex is improved, the workability of the composition for dip molding including the carboxylic acid modified-nitrile based copolymer latex is improved, and the tensile strength of a molded article manufactured from the carboxylic acid modified-nitrile based copolymer is excellent.

The lipid-soluble initiator may include one or more selected from the group consisting of cumene hydroperoxide, benzoyl peroxide, dibutyl peroxide, dicumyl peroxide, and lauroyl peroxide, and as a specific example, the lipid-soluble initiator may be cumene hydroperoxide.

In the method of preparing a carboxylic acid modified-nitrile based copolymer according to the present invention, by introducing the lipid-soluble initiator, hydrophobicity is imparted to polymer particles formed during polymerization to facilitate the adsorption of the emulsifier.

The content of the lipid-soluble initiator may be 0.01 to 0.1 parts by weight, 0.03 to 0.08 parts by weight, or 0.05 to 0.06 parts by weight with respect to a total of 100 parts by weight of the monomer mixture. Specifically, when the content of the lipid-soluble initiator is 0.01 parts by weight or more with respect to a total of 100 parts by weight of the monomer mixture, stability is improved without affecting a polymerization velocity, and when the content is 0.1 parts by weight or less, polymerization in the particles proceeds a lot and stability is improved.

In addition, the lipid-soluble initiator may be introduced with an initiation activator, and in this case, the adsorption effect of the emulsifier to the polymer particles, caused by the lipid-soluble initiator, may be further improved.

In addition, the lipid-soluble initiator may be used with the water-soluble initiator to adjust a polymerization reaction velocity, and in this case, the total content of the lipid-soluble initiator and the water-soluble initiator may be 0.5 parts by weight or less, 0.4 parts by weight or less, or 0.3 parts by weight or less with respect to a total of 100 parts by weight of the monomer mixture, and within the range, by appropriately controlling the polymerization reaction velocity, production of a water-soluble oligomer in the copolymer latex is controlled to improve polymerization stability.

The water-soluble initiator may include one or more selected from the group consisting of sodium persulfate, potassium persulfate, and ammonium persulfate, and as a specific example, may be potassium persulfate.

Polymerization in S10 may be initiated under a condition of the weight ratio (M/W) of the monomer mixture to water of 1.1 to 1.4. Usually, in a reactor having a Reynolds number of 10,000 or more, there is an induction period to temporarily induce polymerization in a micelle at the beginning by introducing oxygen with the reactant to be introduced, and as described above, polymerization proceeds under a condition of a weight ratio (M/W) of 1.1 to 1.4 at polymerization initiation, thereby controlling polymerization which rapidly proceeds in a water phase, not a polymerization reaction in a micelle, to reduce formation of a water-soluble oligomer occurring in a water phase. Thus, polymerization stability at the beginning of polymerization may be improved.

According to an exemplary embodiment of the present invention, S20 is a step of adding water when the polymerization conversion rate of the polymerization is 30 to 40%, to control the weight ratio (M/W) to 0.8 to 1.0. The control means of the weight ratio (M/W) is adding water, as specified above. That is, controlling the weight ratio (M/W) in S20 and subsequent S30 may be performed by adding water.

Specifically, as described above, there is an induction period at the beginning of the reaction, but when the polymerization conversion rate reaches 30 to 40%, the production rate and the polymerization heat reach their peak, and at this time, the weight ratio (M/W) is decreased to 0.8 to 1.0 which is lower than that in S10, thereby decreasing the effective concentration of the emulsifier (concentration of the emulsifier which may cause micelle formation) to reduce the formation of the micelle which produces a water-soluble oligomer. As a result, production of the water-soluble oligomer is decreased to improve polymerization stability.

The sodium naphthalene sulfonate formaldehyde condensate may be a condensate formed by sulfonating naphthalene with sulfuric acid by the following Reaction Formula 1 (step a) and then performing polycondensation in the presence of formaldehyde (step b), and the repeating units (n) of the condensate may be 2 to 30, 2 to 20, or 2 to 10.

[Reaction Formula 1]

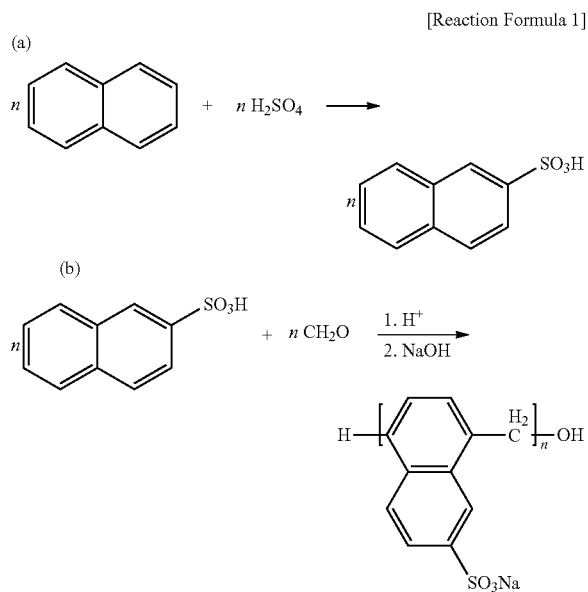

In the method of preparing a carboxylic acid modified-nitrile based copolymer according to the present invention, the sodium naphthalene sulfonate formaldehyde condensate is introduced to decrease a viscosity in a section where the viscosity is rapidly increased.

The introduced amount of the condensate may be 0.1 to 2.0 parts by weight, 0.3 to 0.7 parts by weight, or 0.5 to 0.6 parts by weight with respect to a total of 100 parts by weight of the monomer mixture, and within the range, the viscosity of the carboxylic acid modified-nitrile based copolymer latex may be controlled to the extent that it is easy to manufacture a dip-molded article and a darker color of a molded article is prevented so that appearance is excellent. Specifically, when the introduced amount of the condensate is 0.1 parts by weight or more with respect to a total of 100 parts by weight of the monomer mixture, a latex coagulum is decreased, and when the introduced amount is 2.0 parts by weight or less, a viscosity is decreased.

In addition, the condensate may be introduced all at once, in portions, or continuously when the polymerization conversion rate is 10% or more and less than 60%.

The time when the polymerization conversion rate is 30 to 40% and the time when the polymerization conversion rate is 10% or more and less than 60% may refer to the time when the polymerization conversion rate is 30 to 40% and the time when the polymerization conversion rate is 10% or more and less than 60% with respect to a total of 100 parts by weight of the monomer mixture prepared in S10.

Meanwhile, according to an exemplary embodiment of the present invention, the polymerization conversion rate may be obtained by collecting a certain amount of sample from a reactant in the reaction at regular time intervals, calculating a total solid content (TSC) of the sample, and putting TSC into the following Equation 2:

$$\text{Polymerization conversion rate (\%)} = \{(TSC \times W_{t,t} - W_{t,s})/W_{t,m}\} \times 100 \quad \text{[Equation 2]}$$

wherein TSC denotes a weight of a solid content of a dried sample/a weight of a sample before dried, $W_{t,t}$ denotes a sum of weights of monomers, water, and supplementary raw materials which are introduced to polymerization, $W_{t,s}$ denotes a sum of weights of the supplementary raw materials which are introduced to polymerization in addition to the monomer and water, $W_{t,m}$ denotes a sum of weights of the monomers which are introduced to polymerization, and the supplementary raw material denotes an additive other than the monomers and water introduced to polymerization, such as an emulsifier, an initiator, and a molecular weight adjusting agent.

According to an exemplary embodiment of the present invention, S30 is a step of adding water when the polymerization conversion rate of the polymerization is 60 to 70%, to control the weight ratio (M/W) to 0.6 to 0.7.

Specifically, the time when the polymerization conversion rate is 60 to 70% is a time when the conjugated diene-based monomer is swelled in polymer particles so that a particle surface area is much increased, and at this time, the weight ratio (M/W) is controlled to 0.6 to 0.7 which is lower than that in S20, thereby improving polymerization stability.

In addition, as such, the weight ratio (M/W) is lowered stepwise with the polymerization conversion rate, thereby easily forming the water-soluble oligomers including the carboxylic acid monomer on the surface of finally produced copolymer particles while improving polymerization stability, and in this case, the carboxylic acid on the surface of the copolymer particles and an ionic crosslinking component included in the latex composition for dip molding may form an ionic bond effectively to improve the strength of a molded article, and simultaneously, a hydrated layer in the latex composition for dip molding is formed by the water-soluble oligomer present at an appropriate ratio on the surface of the copolymer particles, thereby having an excellent syneresis characteristics.

According to an exemplary embodiment of the present invention, when the polymerization conversion rate of the polymerization is 10% or more and less than 60%, 0.1 to 2.0 parts by weight of the condensate with respect to a total of 100 parts by weight of the monomer mixture may be introduced. Specifically, when the polymerization conversion rate is 60% or more, monomer droplets are gradually decreased, and thus, deterioration of polymerization stability may be prevented by previously introducing the condensate. That is, in the case in which the condensate is introduced when the polymerization conversion rate is less than 60%, polymerization stability may be improved by introducing the condensate before the droplets of the monomer are decreased. In addition, in the case in which the condensate is introduced when the polymerization conversion rate is 10% or more, the diffusion velocity of the monomer is less affected.

According to an exemplary embodiment of the present invention, the emulsion polymerization may be carried out in the presence of ion exchange water, an emulsifying agent, a polymerization initiator, a molecular weight adjusting agent, and the like.

According to an exemplary embodiment of the present invention, during the polymerization, water may be used as the ion exchange water, and the introduced amount may be the same as that described above.

According to an exemplary embodiment of the present invention, the emulsifying agent may be, as an example, one or more selected from the group consisting of anionic surfactants, nonionic surfactants, cationic surfactants, and ampholytic surfactants, and as a specific example, may be one or more anionic surfactants selected from the group consisting of alkylbenzene sulfonate salts, aliphatic sulfonate salts, higher alcohol sulfate salts, α-olefin sulfonate salts, and alkyl ether sulfate ester salts. In addition, 0.3 parts by weight to 10 parts by weight, 0.8 parts by weight to 8 parts by weight, or 1.5 parts by weight to 6 parts by weight of the emulsifying agent may be introduced with respect to a total of 100 parts by weight of the monomer mixture, and within the range, polymerization stability is excellent and a foam generation amount is small, so that a molded article may be easily manufactured.

According to an exemplary embodiment of the present invention, when the polymerization is carried out by including a molecular weight adjusting agent, a specific example of the molecular weight adjusting agent may include a-methylstyrene dimer, mercaptans such as t-dodecyl mercaptan, n-dodecyl mercaptan, and octyl mercaptan; halogenated hydrocarbons such as carbon tetrachloride, methylene chloride, and methylene bromide; sulfur-containing compounds such as tetraethylthiuram disulfide, dipentamethylenethiuram disulfide, and diisopropylxathogen disulfide, and the like. The molecular weight adjusting agent may be used alone or in combination of two or more. As a specific example, the mercaptans may be used, and a more specific example, the t-dodecyl mercaptan may be used. In addition, 0.1 parts by weight to 2 parts by weight, 0.2 parts by weight to 1.5 parts by weight, or 0.3 parts by weight to 1 parts by weight of the molecular weight adjusting agent may be added with respect to a total of 100 parts by weight of the monomer mixture, and within the range, polymerization stability is excellent and when a molded article is manufactured after the polymerization, the molded article has excellent physical properties.

According to an exemplary embodiment of the present invention, the kind and the introduced amount of polymerization initiator may be the same as those of the lipid-soluble initiator and the water-soluble initiator described above.

According to an exemplary embodiment of the present invention, an additive such as an activator, a chelating agent, a dispersing agent, a pH adjusting agent, a deoxidizing agent, a particle diameter regulator, an anti-aging agent, an antioxidant, an antifoaming agent, and oxygen scavenge may be further introduced, if necessary, in addition to the composition, within a range which does not deteriorate the physical properties of the copolymer.

According to an exemplary embodiment of the present invention, a polymerization temperature in the emulsion polymerization may be in a range of 10 to 90° C., more specifically 20 to 75° C.

According to an exemplary embodiment of the present invention, the emulsion polymerization reaction may be completed when the polymerization conversion rate is 90% or more, or 93% or more. The completion of the polymerization reaction may be performed by adding a polymerization inhibitor, a pH adjusting agent, and an antioxidant. In addition, the finally obtained copolymer latex after the reaction completion may be used after removing an unreacted monomer by a common deodorization and concentration process.

According to the present invention, a latex composition for dip molding including the carboxylic acid modified-nitrile based copolymer latex according to the present invention is provided. The latex composition for dip molding according to the present invention may include the carboxylic acid modified-nitrile based copolymer latex and a crosslinking agent composition.

According to an exemplary embodiment of the present invention, the crosslinking agent composition may include a vulcanizer, a vulcanizing accelerator, and a metal oxide, and as a specific example, may include a vulcanizer, a vulcanizing accelerator, and zinc oxide.

The vulcanizing agent is for vulcanizing the latex composition for dip molding and may be sulfur, and as a specific example, may be sulfur such as sulfur powder, precipitated sulfur, colloidal sulfur, surface-treated sulfur, and insoluble sulfur. The content of the vulcanizer may be 0.1 parts by weight to 10 parts by weight or 1 part by weight to 5 parts by weight, based on a total content of 100 parts by weight (based on solid content) of the carboxylic acid modified-nitrile based copolymer latex in the latex composition for dip molding, and within the range, crosslinking ability by vulcanization is excellent.

In addition, the vulcanizing accelerator may be one or more selected from the group consisting of 2-mercaptobenzothiazole (MBT), 2,2-dithiobisbenzothiazole-2-sulfenamide (MBTS), N-cyclohexylbenzothiasole-2-sulfenamide (CBS), 2-morpholinothiobenzothiazole (MBS), tetramethylthiuram monosulfide (TMTM), tetramethylthiuram disulfide (TMTD), zinc diethyldithiocarbamate (ZDEC), zinc di-n-butyldithiocarbamate (ZDBC), diphenylguanidine (DPG), and di-o-tolylguanidine. The content of the vulcanizing accelerator may be 0.1 parts by weight to 10 parts by weight or 0.5 parts by weight to 5 parts by weight, based on the total content of 100 parts by weight (based on solid content) of the carboxylic acid modified-nitrile based copolymer latex in the latex composition for dip molding, and within the range, crosslinking ability by vulcanization is excellent.

In addition, the metal oxide may include zinc oxide, magnesium oxide, aluminum oxide, and the like, and may be a crosslinking agent for forming an ionic bond to a functional group of the ethylenic unsaturated acid monomer of the carboxylic acid modified-nitrile based copolymer in the latex composition for dip molding to form a crosslinking part by the ionic bond in the carboxylic acid modified-nitrile based copolymer or between the carboxylic acid modified-nitrile based copolymers. The content of the metal oxide may be 0.1 parts by weight to 5 parts by weight or 0.5 parts by weight to 4 parts by weight, based on the total content of 100 parts by weight (based on solid content) of the carboxylic acid modified-nitrile based copolymer latex in the latex composition for dip molding, and within the range, crosslinking ability is excellent, latex stability is excellent, and the tensile strength and the flexibility of the manufactured dip-molded article are excellent.

In according to an exemplary embodiment of the present invention, the latex composition for dip molding may have, as an example, a solid content (concentration) of 5 wt % to 40 wt %, 8 wt % to 35 wt %, or 10 wt % to 30 wt %, and within the range, latex transportation efficiency is excellent and an increase in latex viscosity is prevented to have excellent storage stability.

As another example, the latex composition for dip molding may have a pH of 9 to 12, 9 to 11.5, or 9.5 to 11, and within the range, processability and productivity in manufacture of the dip-molded article are excellent. The pH of the latex composition for dip molding may be adjusted by introducing the pH adjusting agent described above. The pH adjusting agent may be, as an example, an aqueous potassium hydroxide solution having a concentration of 1 wt % to 5 wt %, or ammonia water having a concentration of 1 wt % to 5 wt %.

In addition, according to an exemplary embodiment of the present invention, the latex composition for dip molding may further include an additive, for example, a pigment such as titanium oxide, a filler such as silica, a thickener, and a pH adjusting agent, if necessary.

According to the present invention, a molded article including a layer derived from the latex composition for dip molding is provided. The molded article may be a dip-molded article manufactured by dip molding of the latex composition for dip molding or a molded article including a layer derived from the latex for dip molding formed from the latex composition for dip molding by dip molding.

A method of manufacturing a molded article for molding the molded article may include immersion in the latex composition for dip molding by a direct dipping method, an anode coagulation dipping method, a Teague coagulation dipping method, or the like, and as a specific example, may be performed by the anode coagulation dipping method, and in this case, a dip-molded article having a uniform thickness may be obtained.

As a specific example, the method of manufacturing a molded article may include attaching a coagulant to a dip mold (S100); immersing the dip mold to which the coagulant is attached in the latex composition for dip molding to form a layer derived from the latex composition for a dip molding, that is, a dip molding layer (S200); and heating the dip molding layer to crosslink the latex composition for dip molding (S300).

S100 is a step of soaking the dip mold in a coagulant solution for forming the coagulant on the dip mold to attach the coagulant to the surface of the dip mold, and the coagulant solution is a solution in which a coagulant is dissolved in water, alcohol, or a mixture thereof and the content of the coagulant in the coagulant solution may be 5 wt % to 75 wt %, 10 wt % to 65 wt %, or 13 wt % to 55 wt % with respect to the total content of the coagulant solution.

The coagulant may be, as an example, one or more selected from the group consisting of metal halides such as barium chloride, calcium chloride, magnesium chloride, zinc chloride, and aluminum chloride; nitrates such as barium nitrate, calcium nitrate, and zinc nitrate; acetates such as barium acetate, calcium acetate, and zinc acetate; and sulfates such as calcium sulfate, magnesium sulfate, and aluminum sulfate, and as a specific example, may be calcium chloride or calcium nitrate.

In addition, S100 may further include soaking the dip mold in the coagulant solution for 1 minute or more for attaching the coagulant to the dip mold, taking out the dip mold, and drying the dip mold at 70 to 150° C.

In addition, S200 may be a step of immersing the dip mold to which the coagulant is attached in the latex composition for dip molding according to the present invention for forming the dip molding layer, and taking out the dip mold and forming the dip molding layer on the dip mold.

In addition, in S200, during immersion, the immersion may be performed for 1 minute or more, for forming the dip molding layer on the dip mold.

In addition, S300 may be a step of heating the dip molding layer formed on the dip mold to evaporate liquid components for obtaining the dip-molded article and crosslinking the latex composition for dip molding to proceed with curing. Here, when the latex composition for dip molding according to the present invention is used, crosslinking by vulcanization and/or an ionic bond of the vulcanizer and/or the crosslinking agent included in the latex composition for dip molding may be performed. In addition, according to an exemplary embodiment of the present invention, the heating may be performed by primary heating at 70° C. to 150° C. for 1 minute to 10 minutes and then secondary heating at 100° to 180° for 5 minutes to 30 minutes.

Thereafter, the dip molding layer which is crosslinked by a heating treatment may be stripped from the dip mold to obtain the dip-molded article.

According to an exemplary embodiment of the present invention, the molded article may be gloves such as surgical gloves, examination gloves, industrial gloves, and household gloves, condoms, catheters, or health care products.

Hereinafter, the present invention will be described in more detail by the Examples. However, the following Examples are provided for illustrating the present invention. It is apparent to a person skilled in the art that various modifications and alterations may be made without departing from the scope and spirit of the present invention, and the scope of the present invention is not limited thereto.

EXAMPLES

In the preparation of a carboxylic acid modified-nitrile based copolymer latex composition, a diameter of an agitator of a polymerization reactor was 150 mm, a stirring speed was adjusted so that a tip speed of the agitator was 4 m/s, and a Reynolds number (Re) at this time was about 20,000. Hereinafter, all polymerization reactions in the Examples and the Comparative Examples were performed under the same conditions as these.

Example 1

<Preparation of Carboxylic Acid Modified-Nitrile Based Copolymer Latex>

(1) Step of Polymerization Initiation (S10)

To a polymerization reactor, a monomer mixture including 29.5 wt % of acrylonitrile, 63 wt % of 1,3-butadiene, 6.0 wt of methacrylic acid, and 1.5 wt % of 2-hydroxyethyl acrylate, and 0.5 parts by weight of t-dodecyl mercaptan, 2.5 parts by weight of sodium benzene sulfonate, 0.25 parts by weight of potassium persulfate, 0.05 parts by weight of cumene hydroperoxide, 0.01 parts by weight of an initiation activator, and 90 parts by weight of water with respect to 100 parts by weight of the monomer mixture were introduced, and polymerization was initiated at a temperature of 37° C.

(2) Step of Primary Addition of Water and Introduction of Condensate (S20)

When a polymerization conversion rate reached 10%, 0.5 parts by weight of sodium naphthalene sulfonate formaldehyde condensate (hereinafter, referred to as a condensate) was introduced, when the polymerization conversion rate reached 35%, 30 parts by weight of water was added, and polymerization was subsequently performed.

(3) Step of Secondary Addition of Water (S30)

When the polymerization conversion rate reached 63%, parts by weight of water was added, and when the polymerization conversion rate reached 95%, 0.3 parts by weight of ammonium hydroxide was added to stop the polymerization. Thereafter, unreacted reactants were removed by a deodorization process, and ammonia water, an antioxidant, and an antifoaming agent were added to obtain a carboxylic acid modified-nitrile based copolymer latex having a solid content concentration of 45% at pH 8.5.

<Preparation of Latex Composition for Dip Molding>

1 part by weight of sulfur, 0.7 parts by weight of zinc di-n-butyldithiocarbamate (ZDBC), 1.5 parts by weight of zinc oxide, 1 part by weight of titanium oxide, a potassium hydroxide solution, and secondary distilled water were added to 100 parts by weight (based on solid content) of the thus-obtained carboxylic acid modified-nitrile based copolymer latex to obtain a latex composition for dip molding having a solid content concentration of 16 wt % at pH 10.

<Manufacture of Dip-Molded Article>

13 wt % of calcium nitrate, 86.5 wt % of water, and 0.5 wt % of a wetting agent (manufactured by Huntsman Corporation, Australia, product name: Teric 320) were mixed to prepare a coagulant solution, and a hand-shaped ceramic mold was soaked in this solution, taken out, and dried at 80° C. for 3 minutes to apply the coagulant on the hand-shaped ceramic mold.

Subsequently, the hand-shaped ceramic mold to which the coagulant was applied was soaked in the latex composition for dip molding obtained above, taken out, dried at 80° C. for 1 minute, and then soaked in water for 3 minutes. Again, the mold was dried at 80° C. for 1 minute, and crosslinked at 125° C. for 20 minutes. Thereafter, the crosslinked dip molding layer was stripped from the hand-shaped mold to manufacture a glove-shaped dip-molded article.

Example 2

The process was performed in the same manner as in Example 1, except that in the preparation of the carboxylic acid modified-nitrile based copolymer latex, 72 parts by weight of water was introduced instead of 90 parts by weight in S10, and 45 parts by weight of water was introduced instead of 40 parts by weight in S30.

Example 3

The process was performed in the same manner as in Example 1, except that in the preparation of the carboxylic acid modified-nitrile based copolymer latex, 0.5 parts by weight of the condensate was introduced when the polymerization conversion rate reached 50%, not 10% in S20.

Example 4

The process was performed in the same manner as in Example 1, except that in the preparation of the carboxylic acid modified-nitrile based copolymer latex, 0.3 parts by weight of the condensate was introduced when the polymerization conversion rate reached 20%, not 10%, and 0.2 parts by weight of the condensate was introduced when the polymerization conversion rate reached 50% in S20.

Example 5

The process was performed in the same manner as in Example 1, except that in the preparation of the carboxylic acid modified-nitrile based copolymer latex, 0.5 parts by weight of the condensate was continuously introduced in a certain amount from when the polymerization conversion rate reached 10% until the polymerization conversion rate reached 40%, not when the polymerization conversion rate reached 10% in S20.

COMPARATIVE EXAMPLE

Comparative Example 1

The process was performed in the same manner as in Example 1, except that in the preparation of the carboxylic acid modified-nitrile based copolymer latex, a monomer mixture including 30 wt % of acrylonitrile, 64 wt % of 1,3-butadiene, and 6 wt % of methacrylic acid, without including the water-soluble monomer was used in S10.

Comparative Example 2

The process was performed in the same manner as in Example 1, except that in the preparation of the carboxylic acid modified-nitrile based copolymer latex, 0.05 parts by weight of cumene hydroperoxide was not introduced in S10.

Comparative Example 3

The process was performed in the same manner as in Example 1, except that in the preparation of the carboxylic acid modified-nitrile based copolymer latex, 0.5 parts by weight of the condensate was not introduced in S20.

Comparative Example 4

The process was performed in the same manner as in Example 1, except that in the preparation of the carboxylic acid modified-nitrile based copolymer latex, 0.5 parts by weight of the condensate was introduced from when the polymerization conversion rate reached 65%, not 10% in S20.

Comparative Example 5

The process was performed in the same manner as in Example 1, except that in the preparation of the carboxylic acid modified-nitrile based copolymer latex, 140 parts by weight of water was introduced instead of 90 parts by weight in S10, and water was not added in S20 and S30.

Comparative Example 6

The process was performed in the same manner as in Example 1, except that in the preparation of the carboxylic acid modified-nitrile based copolymer latex, 70 parts by weight of water was introduced instead of 30 parts by weight in S20, and addition of water in S30 was not performed.

Comparative Example 7

In Example 7, the diameter of the agitator impeller of the polymerization reactor was 75 mm, the stirring speed was adjusted so that the tip speed of the agitator was 2 m/s, and a Reynolds number (Re) at this time was about 5,000. In addition, cumene hydroperoxide as a lipid-soluble initiator and the condensate were not introduced. The process was performed in the same manner as in Example 1, except the stirring conditions and the introduction of the lipid-soluble initiator and the condensate.

EXPERIMENTAL EXAMPLE

Experimental Example 1

The polymerization stability of the carboxylic acid modified-nitrile based copolymer latex, the workability of the latex composition for dip molding, and the tensile properties (tensile strength, elongation, and modulus at 300%) of the dip-molded article (glove), produced from the Examples and the Comparative Examples were measured as follows, and are shown in the following Tables 1 and 2.

(1) Polymerization stability: The carboxylic acid modified-nitrile based copolymer latex obtained was filtered using a 200 mesh net, and the amount of coagulum caught in the net was calculated in ppm by using a solid content and the amount of latex filtered. As the amount of coagulum was small, the polymerization stability of the copolymer latex was determined to be excellent.

(2) Tensile strength (MPa): in accordance with a method of ASTM D-412, a crosshead speed was raised to 500 mm/min using a measuring instrument U.T.M (Instron, model 4466), a point where the specimen was cut was measured, and the tensile strength was calculated according to the following Equation 3:

$$\text{Tensile strength (MPa)} = \text{load value (kgf)} / (\text{thickness (mm)} \times \text{width (mm)}). \quad \text{[Equation 3]}$$

(3) Elongation (%): in accordance with the method of ASTM D-412, a crosshead speed was raised to 500 mm/min using a measuring instrument U.T.M (Instron, model 4466), a point where the specimen was cut was measured, and the elongation was calculated according to the following Equation 4:

$$\text{Elongation (\%)} = (\text{length after specimen elongation} / \text{initial length of specimen}) \times 100. \quad \text{[Equation 4]}$$

(4) Modulus at 300% (MPa): in accordance with the method of ASTM D-412, a crosshead speed was raised to 500 mm/min using a measuring instrument U.T.M (Instron, model 4466), and then a stress when the elongation was 300% was measured.

(5) Syneresis: A hand-shaped ceramic mold was soaked in a coagulant solution used in the manufacture of the dip-molded article for 1 minute, taken out, and dried at 80° C. for 3 minutes to apply the coagulant on the hand-shaped ceramic mold. Thereafter, the hand-shaped ceramic mold to which the coagulant was applied was soaked in the latex composition for dip molding of each of the Examples and the Comparative Examples for 1 minute and taken out, and a time it took for water droplets to fall from the hand-shaped mold was measured. When the water droplets did not fall within 5 minutes, it was indicated as X, and in this case, syneresis was determined to be excellent.

TABLE 1

|  |  | Example 1 | Example 2 | Example 3 | Example 4 | Example 5 |
|---|---|---|---|---|---|---|
| Reynolds number | | 20,000 | 20,000 | 20,000 | 20,000 | 20,000 |
| Whether water-soluble monomer was introduced | | ○ | ○ | ○ | ○ | ○ |
| Whether lipid-soluble initiator was introduced | | ○ | ○ | ○ | ○ | ○ |
| Time when condensate was introduced and introduced amount (parts by weight) | | 10% (0.5) | 10% (0.5) | 50% (0.5) | 20% (0.3), 50% (0.2) | 10-40% (0.5) continuous introduction |
| M/W weight ratio | Step (S10) | 1.11 | 1.39 | 1.11 | 1.11 | 1.11 |
| | Step (S20) | 0.83 | 0.98 | 0.83 | 0.83 | 0.83 |
| | Step (S30) | 0.63 | 0.68 | 0.63 | 0.63 | 0.63 |
| Polymerization coagulum (ppm) | | 30 | 23 | 18 | 45 | 26 |
| Syneresis (min) | | x | x | x | x | x |
| Physical properties of glove | Tensile strength (MPa) | 35 | 34.7 | 36 | 33 | 35 |
| | Elongation (%) | 520 | 532 | 525 | 535 | 529 |
| | Modulus at 300% (MPa) | 6.8 | 6.5 | 7.0 | 6.7 | 6.0 |

TABLE 2

|  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Reynolds number | | 20,000 | 20,000 | 20,000 | 20,000 | 20,000 | 20,000 | 5,000 |
| Whether water-soluble monomer was introduced | | x | o | o | o | o | o | o |
| Whether lipid-soluble initiator was introduced | | o | x | o | o | o | o | x |
| Time when condensate was introduced and introduced amount (parts by weight) | | 10% (0.5) | 10% (0.5) | x | 65% (0.5) | 10% (0.5) | 10% (0.5) | x |
| M/W weight ratio | Step (S10) | 1.11 | 1.11 | 1.11 | 1.11 | 0.71 | 1.11 | 1.11 |
| | Step (S20) | 0.83 | 0.83 | 0.83 | 0.83 | — | 0.63 | 0.83 |
| | Step (S30) | 0.63 | 0.63 | 0.63 | 0.63 | — | — | 0.63 |
| Polymerization coagulum (ppm) | | 20 | 2000 | 2600 | 1900 | 860 | 900 | 54 |
| Syneresis (min) | | 1 min | 3 min | 2 min | 3 min | 3 min | 3 min | 2 min |
| Physical properties of glove | Tensile strength (MPa) | 28 | 31 | 31 | 29 | 28 | 30 | 31 |
| | Elongation (%) | 505 | 510 | 505 | 500 | 500 | 502 | 510 |
| | Modulus at 300% (MPa) | 7.0 | 6.8 | 7.0 | 7.0 | 6.9 | 7.1 | 6.7 |

In Tables 1 and 2, M/W is a weight ratio of the monomer mixture with respect to the entire water introduced, and this value is represented by rounding off to the nearest hundredth.

Referring to Tables 1 and 2, in Examples 1 to 5 in which the lipid-soluble initiator was introduced before polymerization initiation, the condensate was introduced when the polymerization conversion rate was 10% or more and less than 60%, and the weight ratios (M/W) before polymerization initiation, when the polymerization conversion rate was 30 to 40%, and when the polymerization conversion rate was 60 to 70% were in an appropriate range, according to the preparation method of the present invention, the content of the coagulum in the copolymer latex after polymerization was small so that excellent polymerization stability was confirmed, and it was confirmed that the syneresis characteristics of the composition for dip molding including the polymerized copolymer latex and the tensile properties of the dip-molded article (glove) were also excellent.

Meanwhile, in Comparative Example 1 in which the water-soluble monomer was not included in the monomer mixture, it was confirmed that the content of the coagulum in the latex after polymerization was small, this is determined to be due to the fact that since the water-soluble monomer was not included, the water-soluble oligomer was not formed during polymerization. However, in this case, the syneresis of the composition for dip molding and the physical properties of the gloves were significantly lowered as compared with the case including the water-soluble monomer. In addition, in Comparative Example 7 in which the Reynolds number to the fluid flow in the reactor was less than 10,000, though the water-soluble monomer was included in the monomer mixture, it was confirmed that the content of the coagulum in the latex after polymerization was small, but in this case, the productivity of the copolymer latex was not improved.

In addition, in the case in which the lipid-soluble initiator was not introduced (Comparative Example 2), in the case in which the condensate was not introduced (Comparative Example 3), in the case in which the condensate was introduced but the introduction time was out of the appropriate range (Comparative Example 4), in the case in which the weight ratio (M/W) value before polymerization reaction initiation was out of the appropriate range (Comparative Example 5), or in the case in which the weight ratio (M/W) value was out of the appropriate range when the polymerization conversion rate was 30 to 40% (Comparative Example 6), it was confirmed that the polymerization stability of the copolymer latex, the syneresis characteristics of the composition for dip molding, and the tensile properties of the dip-molded article were significantly lowered as compared with the Examples.

Therefore, when the conditions that the lipid-soluble initiator was introduced before polymerization initiation, the condensate was introduced when the polymerization conversion rate was 10% or more and less than 60%, and the weight ratios (M/W) before polymerization initiation, when the polymerization conversion rate was 30 to 40%, and when the polymerization conversion rate was 60 to 70% were in an appropriate range, according to the preparation method of the present invention, were all satisfied, it was confirmed that the polymerization stability of the copolymer latex, the syneresis characteristics of the composition for dip molding including the polymerized copolymer latex, and the tensile properties of the dip-molded article (glove) were all improved.

The invention claimed is:

1. A method of preparing a carboxylic acid modified-nitrile based copolymer latex, the method comprising:
   step S10: in a reactor, initiating emulsion polymerization of a monomer mixture in the presence of water and 0.01 to 0.1 parts by weight of a lipid-soluble initiator, based on 100 parts by weight of the total monomer mixture, wherein a weight ratio (M/W) of the monomer mixture to water is 1.1 to 1.4, and the monomer mixture comprises a conjugated diene-based monomer, an ethylenic unsaturated nitrile-based monomer, an ethylenic unsaturated acid monomer, and a water-soluble monomer;
   step S20: adding water to the reactor when a polymerization conversion rate of the polymerization is 30 to 40%, to control the weight ratio (M/W) to 0.8 to 1.0; and step S30: adding water to the reactor when the polymerization conversion rate of the polymerization is 60 to 70%, to control the weight ratio (M/W) to 0.6 to 0.7;

wherein 0.1 to 2.0 parts by weight of a sodium naphthalene sulfonate formaldehyde condensate, based on 100 parts by weight of the total monomer mixture, is added to the reactor while the polymerization conversion rate of the polymerization is 10% or more and less than 60%.

2. The method of preparing a carboxylic acid modified-nitrile based copolymer latex of claim 1, wherein in steps S10 to S30, a Reynolds number (Re) to an entire fluid flow including reactants introduced to the reactor is 10,000 or more.

3. The method of preparing a carboxylic acid modified-nitrile based copolymer latex of claim 1, wherein the sodium naphthalene sulfonate formaldehyde condensate is introduced all at once, in portions, or continuously while the polymerization conversion rate is 10% or more and less than 60%.

4. The method of preparing a carboxylic acid modified-nitrile based copolymer latex of claim 1, wherein the lipid-soluble initiator is one or more selected from the group consisting of cumene hydroperoxide, benzoyl peroxide, dibutyl peroxide, dicumyl peroxide, and lauroyl peroxide.

5. The method of preparing a carboxylic acid modified-nitrile based copolymer latex of claim 1, wherein the water-soluble monomer is one or more selected from the group consisting of a hydroxyalkyl (meth)acrylate and acrylamide.

6. The method of preparing a carboxylic acid modified-nitrile based copolymer latex of claim 5, wherein the hydroxyalkyl (meth)acrylate is one or more selected from the group consisting of 2-hydroxyethyl methacrylate, 2-hydroxypropyl methacrylate, 3-hydroxypropyl methacrylate, 2-hydroxyethyl acrylate, 2-hydroxypropyl acrylate, and 3-hydroxypropyl acrylate.

7. The method of preparing a carboxylic acid modified-nitrile based copolymer latex of claim 1, wherein a water-soluble initiator is also present in step S10, and a total content of the lipid-soluble initiator and the water-soluble initiator does not exceed 0.5 parts by weight, based on 100 parts by weight of the total monomer mixture.

8. The method of preparing a carboxylic acid modified-nitrile based copolymer latex of claim 7, wherein the water-soluble initiator is one or more selected from the group consisting of sodium persulfate, potassium persulfate, and ammonium persulfate.

9. The method of preparing a carboxylic acid modified-nitrile based copolymer latex of claim 1, wherein the monomer mixture comprises 40 to 70 wt % of the conjugated diene-based monomer, 20 to 40 wt % of the ethylenic unsaturated nitrile-based monomer, 4 to 10 wt % of the ethylenic unsaturated acid monomer, and 0.5 to 10 wt % of the water-soluble monomer, based on the total monomer mixture.

10. The method of preparing a carboxylic acid modified-nitrile based copolymer latex of claim 1, wherein the conjugated diene-based monomer comprises one or more selected from the group consisting of 1,3-butadiene, 1,4-butadiene, 2,3-dimethyl-1,3-butadiene, 2-ethyl-1,3-butadiene, 1,3-pentadiene, piperylene, 3-butyl-1,3-octadiene, 2-phenyl-1,3-butadiene, and isoprene.

11. The method of preparing a carboxylic acid modified-nitrile based copolymer latex of claim 1, wherein the ethylenic unsaturated nitrile-based monomer comprises one or more selected from the group consisting of acrylonitrile, methacrylonitrile, fumaronitrile, α-chloronitrile, and α-cyanoethylacrylonitrile.

12. The method of preparing a carboxylic acid modified-nitrile based copolymer latex of claim 1, wherein the ethylenic unsaturated acid monomer comprises one or more selected from the group consisting of acrylic acid, methacrylic acid, itaconic acid, maleic acid, fumaric acid, anhydrous maleic acid, anhydrous citraconic acid, styrene sulfonic acid, monobutyl fumarate, monobutyl maleate, and mono-2-hydroxylpropyl maleate.

* * * * *